(12) United States Patent
Kiyosu et al.

(10) Patent No.: US 7,079,270 B2
(45) Date of Patent: Jul. 18, 2006

(54) COLOR IMAGE PROCESSING APPARATUS AND COLOR IMAGE PROCESSING SYSTEM USING THE APPARATUS

(75) Inventors: Tetusya Kiyosu, Tokyo (JP); Satoshi Suzuki, Tokyo (JP); Hirofumi Kuramoto, Kanagawa (JP); Nobuhisa Katoh, Kanagawa (JP); Eisuke Kawasaki, Tokyo (JP); Mari Kodama, Kanagawa (JP); Ryuichi Ishizuka, Kanagawa (JP); Yasushi Nishide, Kanagawa (JP); Kouichi Kawahara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 855 days.

(21) Appl. No.: 09/880,041

(22) Filed: Jun. 14, 2001

(65) Prior Publication Data

US 2001/0052998 A1    Dec. 20, 2001

(30) Foreign Application Priority Data

Jun. 15, 2000 (JP) ............... P.2000-180032
Jan. 22, 2001 (JP) ............... P.2001-013448
Jan. 22, 2001 (JP) ............... P.2001-013615

(51) Int. Cl.
*G06K 15/00* (2006.01)
(52) U.S. Cl. .............. 358/1.15; 358/2.1; 358/504; 358/527
(58) Field of Classification Search ............. 358/1.15, 358/1.9, 2.1, 500, 501, 504, 516, 518, 520, 358/527, 530
See application file for complete search history.

(56) References Cited

U.S. PATENT DOCUMENTS

| 6,728,947 B1* | 4/2004 | Bengston | 717/103 |
| 2002/0051213 A1* | 5/2002 | Yoshiaki | 358/296 |
| 2002/0080168 A1* | 6/2002 | Hilliard et al. | 345/744 |
| 2002/0141639 A1* | 10/2002 | Steinberg | 382/167 |

FOREIGN PATENT DOCUMENTS

| JP | 03-277074 | 12/1991 |
| JP | 06-003911 | 1/1994 |
| JP | 08-009179 | 1/1996 |
| JP | 08-079546 | 3/1996 |
| JP | 08-102856 | 4/1996 |
| JP | 08-307713 | 11/1996 |

(Continued)

*Primary Examiner*—Jerome Grant, II
(74) *Attorney, Agent, or Firm*—Morgan, Lewis & Bockius LLP

(57) ABSTRACT

When an output unit to produce output is specified through an instruction terminal 11 and original data is input to a color proof generation section 12, a color conversion section 13 acquires a color conversion parameter corresponding to the specified output unit from a color conversion information storage section 14 and performs color conversion processing for the original data so as to accomplish precise color reproduction in the specified output unit. A rasterizing section 15 expands the original data after undergoing the color conversion processing into raster data while using an enormous number of fonts in a font storage section 16. The raster data provided by the rasterizing section 15 is transmitted from a communication section 17 through a network 4 to the specified output unit. If a remote system 2 or 3, which receives the raster data, prints out on output unit 21 or 31, a color proof whose color is reproduced precisely can be provided.

25 Claims, 9 Drawing Sheets

FOREIGN PATENT DOCUMENTS

| | | |
|---|---|---|
| JP | 09-027916 | 1/1997 |
| JP | 10-136217 | 5/1998 |
| JP | 10-178557 | 6/1998 |
| JP | 10-200772 | 7/1998 |
| JP | 10-224643 | 8/1998 |
| JP | 11-015799 | 1/1999 |
| JP | 11-164148 | 6/1999 |
| JP | 11-232073 | 8/1999 |
| JP | 11-313216 | 11/1999 |
| JP | 2000-041126 | 2/2000 |

* cited by examiner

FIG. 2

|  | REMOTE SYSTEM 2 | | REMOTE SYSTEM 3 | | .... |
| --- | --- | --- | --- | --- | --- |
|  | OUTPUT UNIT 21 | .... | OUTPUT UNIT 31 | .... | .... |
| TARGET A | COLOR CONVERSION INFORMATION a | .... | COLOR CONVERSION INFORMATION b | .... | .... |
| TARGET B | COLOR CONVERSION INFORMATION c | .... | COLOR CONVERSION INFORMATION d | .... | .... |
| TARGET C | COLOR CONVERSION INFORMATION e | .... | COLOR CONVERSION INFORMATION f | .... | .... |
| ...... | ...... | .... | ...... | .... | .... |

FIG. 5

| | REMOTE SYSTEM 2 | | | | | REMOTE SYSTEM 3 | | | | |
|---|---|---|---|---|---|---|---|---|---|---|
| | OUTPUT UNIT 21 | | ... | ... | ... | OUTPUT UNIT 31 | | ... | ... | ... |
| | RANK 1 | RANK 2 | ... | ... | ... | RANK 1 | RANK 2 | ... | ... | ... |
| TARGET A | COLOR CONVERSION INFORMATION a1 | COLOR CONVERSION INFORMATION a2 | ... | | | | | | | |
| TARGET B | COLOR CONVERSION INFORMATION c1 | COLOR CONVERSION INFORMATION c2 | ... | | | COLOR CONVERSION INFORMATION b1 | COLOR CONVERSION INFORMATION b2 | ... | | |
| TARGET C | COLOR CONVERSION INFORMATION e1 | COLOR CONVERSION INFORMATION e2 | ... | | | COLOR CONVERSION INFORMATION d1 | COLOR CONVERSION INFORMATION d2 | ... | | |
| ... | | | | | | COLOR CONVERSION INFORMATION f1 | COLOR CONVERSION INFORMATION f2 | ... | | |
| | | | | | | ... | ... | ... | ... | ... |

COLOR IMAGE PROCESSING APPARATUS AND COLOR IMAGE PROCESSING SYSTEM USING THE APPARATUS

BACKGROUND OF THE INVENTION

1. Filed of the Invention

This invention relates to a color image processing apparatus for causing an output unit connected via a network to output a color image and a color image processing system using such the color image processing apparatus.

2. Description of the Related Art

In case of producing printed matter, steps of planning, design, production, proofreading, plate-making, printing plate, and final printing are executed. Various peoples and enterprises are involved in the steps. In recent years, a mechanized system has been used in the process from plate-making to printing. The steps of planning, design, and production are also being mechanized with widespread use of personal computers, etc. However, under the present circumstances, particularly the proofreading relies on the manpower.

In the proofreading work, the whole design, placement of each of characters and images, color and font of each of parts, and the like are checked in detail elaborately for completing printed matter responsive to a demand of an orderer. In the proofreading work, the orderer and the production department and the departments on and after the plate-making communicate with each other repeatedly until the proof is OKed.

Particularly, if the orderer is a color-minded orderer, color matching is executed multiple times during the proofreading. At this time, as the sample (color proof) shown for the orderer, the same color as the final printed matter must be reproduced; otherwise, the proof is not OKed and if the final printed matter color differs from the color proof, an objection is raised to the final printed matter.

FIG. 9 is a schematic representation of an example of an outline of a production process of general printed matter. In the figure, numeral 961 denotes a client, numeral 962 denotes a production company, numeral 963 denotes a plate-making company, numeral 964 denotes a printing company, numeral 971 denotes a production system, numeral 972 denotes a comprehensive layout, numeral 981 denotes an image setter, numeral 982 denotes a film, numeral 983 denotes plate-making, numeral 984 denotes a PS plate, numeral 985 denotes a flatbed proofreading machine, numeral 986 denotes a proof, numeral 991 denotes a printer, and numeral 992 denotes printed matter. The production company 962 determines the concept of printed matter with the client 961 and uses the production system 971, etc., to design the printed matter. At this time, the image (outline) of the printed matter designed is converted into raster data in the production system 971 and color conversion processing, etc., is performed and then the result is output on a printer in the production system 971 to prepare the comprehensive layout 972. Using the comprehensive layout 972, the production company 962 makes arrangements with the client 961 for determining a specific printed matter image (outline). If the production company 962 comes to an agreement with the client 961 using the comprehensive layout 972, the image data in the production system 971 at the time is passed to the plate-making company 963.

In the plate-making company 963, an image is provided by the image setter 981, for example, based on the image data passed from the production company 962 and color conversion processing, etc., is performed and color films 982 of Y, M, C, and K, for example, are prepared, respectively. In the plate-making 983, the films 982 are burnt into the PS plates 984. A printing plate may be prepared directly from the image data passed from the production company 962 by CTP (computer to plate).

The PS plates 984 thus prepared can be used to print on the printer 991; final proofreading is executed before actual printing is executed. Thus, using the PS plates 984, the proof 986 is prepared with the flatbed proofreading machine of a manual printer and consent of the client 961 is obtained. To make a correction at this point in time, the process is again executed starting at preparation of the films 982.

If consent of the client 961 is obtained and the proof is OKed, the proof 986 and the films 982 are brought into the printing company 964 and in the printing company 964, the PS plates 984 are prepared and the printed matter 992 is printed on the printer 991. At this time, the printer 991 is adjusted so that the color of the printed matter 992 becomes almost the same as the color of the proof 986. After this, cutting, binding, and the like are performed to complete final printed matter.

In such a printing process, the client 961 makes a final check using the proof 986, because the proof 986 has color reproducibility closest to the finished quality of the final printed matter 992. In the related art, the sales representative in the production company or the plate-making company takes the proof 986 with him or her to the client 961 for obtaining consent of the client 961; this is a large burden from the points of costs and time. To make a correction, it is necessary to again execute the process starting at preparation of the films 982 and there is a problem of the long process at high costs.

The comprehensive layout 972 is also prepared in the production company 962 and it is also possible to execute the final proofreading using the comprehensive layout 972. In fact, however, a color conversion characteristic in the production system 971 and a color reproduction characteristic of the printer differ from a color characteristic in the process of preparing the proof 986 and therefore the comprehensive layout 972 and the proof 986 vary in hue or tint even if the same image data is used. Thus, if the proof is OKed in the state of the comprehensive layout 972 and printing is executed as it is, the hue or tint of the printed matter may differ from that at the proofreading time and the client 961 will make an objection. Therefore, it is impossible to execute the final proofreading using the comprehensive layout 972; this is a problem.

If the proof 986 can be output on a printer owned by the client 961, the labor and time for the sales representative to visit the client 961 can be eliminated.

However, various types of output units adopting different print technologies are used and color development varies from one type to another. For example, an electrophotographic output unit and an ink jet output unit differ in used color material, color of each color material, and color development mechanism. In addition to the variations in color development from one print technology to another, the output units adopting the same print technology differ in machine property. Thus, if the same color data is used electronically, the actual print color varies delicately depending on the output unit for providing printout. Further, the color may change with time even if the same output unit is used.

Since the color thus varies from one output unit to another, if different printers are used in departments involved in each process, such as the design company, the production company, and the plate-making company, the colors of the proofs printed out in the design department and the production department, the colors of the proofs printed out in the departments on and after the plate-making department, and the colors intended by the orderer may differ. It is impossible to conduct color proofreading for a long, long time.

Since the computer is introduced into the production process as described above, it is possible to send produced electronic data to the orderer and print the electronic data and proofread in the orderer. Most simply, the electronic data of printed matter prepared in the production department is transmitted to the orderer, for example, by mail, etc., and the orderer prints out the electronic data on the orderer's printer, etc., and proofreads. In this case, however, the orderer prints based on color adjustment of the orderer and thus the production department and the orderer use different printers and different proof colors are produced, as described above. The orderer does not see the fact that the color differs from that produced in the production department, and gives an OK, leading to trouble of a discrepancy between the finished printed matter color and the intended color.

As a system for printing out in the same hue or tint in the production department and the orderer, it is possible to execute color conversion and output in their respective departments so as to output the same color. FIG. 8 is a schematic representation of an example of a color image processing apparatus and a color image processing system. In the figure, numeral 871 denotes a production party system, numeral 872 denotes an ordered party system, numeral 873 denotes the Internet, numerals 881 and 891 denote output instruction sections, numerals 882 and 892 denote color management sections, numerals 883 and 893 denote rasterizers, and numerals 884 and 894 denote output units. The production party system 871 and the ordered party system 872 have the same configuration and are connected by the Internet.

In the production party system 871, when an instruction for printing original data is given in the output instruction section 881, color conversion processing responsive to the output unit 884 is performed in the color management section 882. The original data after undergoing the color conversion is expanded into raster data in the rasterizer 883 and the raster data is printed out on the output unit 884.

On the other hand, the original data is sent from the production party system 871 through the Internet 873 to the ordered party system 872. In the ordered party system 872, when an instruction for printing the original data sent from the production party system 871 is given in the output instruction section 891, color conversion processing responsive to the output unit 894 is performed in the color management section 892. The original data after undergoing the color conversion is expanded into raster data in the rasterizer 893 and the raster data is printed out on the output unit 894.

In the color image processing system, the color management section 882 of the production party system 871 and the color management section 892 of the ordered party system 872 execute color conversion so as to print in the same color on the output units 884 and 894. At this time, the print technology difference, the machine property difference, and the like as described above are considered for executing the color conversion. Thus, if the output unit 884 of the production party system 871 and the output unit 894 of the ordered party system 872 differ, the same color can be reproduced on output printed matter.

To construct such a color image processing system, a system including the color management section and the rasterizer must be installed for each of the departments (enterprises, offices, etc.,) for printing out. To prepare printed matter, usually a large number of enterprises, offices, etc., are involved as described above. Thus, the system as described above needs to be installed in every involved company.

However, the color management section must execute color conversion responsive to the output unit as described above and thus very skilled adjustment and setting are required. The rasterizer comprises an enormous number of fonts (several hundreds) in the print field and is intended for responding to any requests. Fonts will be added whenever necessary upon request. The fonts are very expensive and cannot be purchased in small and medium-sized enterprises, offices, etc. The number of experts who can carry out skilled color adjustment and setting is limited and general operators easily cause a color difference to occur by erroneous operation. Thus, the system as shown in FIG. 8 is not generally available and in most cases, paper, etc., is still passed and the productivity is poor.

In recent years, an apparatus for preparing a proof responsive to the used printer based on the image data prepared in the production company 962 (DDCP) has also been developed. The apparatus can be used to prepare the proof 986 without preparing the films 982 or the PS plates 984, and the proofreading cost can be reduced. A similar apparatus is installed, whereby the proof 986 can also be output in any other than the plate-making company. However, such an apparatus is very expensive and the production company or the client cannot afford to install the apparatus. Therefore, the process in which the plate-making company 963 prepares the proof 986 and presents the proof 986 to the client 961 in the related art as described above cannot be changed.

Further, in the output units such as printers, the reproduced color will change with time or will change because of replacement of parts such as consumable items. Thus, if color reproduction similar to that on the proof 986 can be accomplished at one point in time on the output unit such as the printer installed in the client 961 or the production company 962, the later color reproduction is not necessary the same as the previous color reproduction. Therefore, the color difference between output and the proof 986 in the client 961 or the production company 962 grows with the passage of time, and it is made impossible to conduct color proofreading based on the output in the client 961 or the production company 962; this is a problem.

SUMMARY OF THE INVENTION

It is therefore an object of the invention to provide a color image processing system that can be constructed at low costs and moreover enables any output units connected to a network to output color proofs reproduced in precise colors and a color image processing apparatus that can be used with the color image processing system.

In the invention, color proof generation section performs color conversion processing for original data so as to conduct precise color reproduction in an output unit specified as an output target, and further expands the original data into raster data. The raster data provided by the color proof generation section is transferred via a network to the specified output unit. Accordingly, for example, if the transfer destination is an output unit connected via the Internet, a telephone line, etc., color conversion processing responsive to the output unit is performed and a color proof reproduced in precise color is output from the output unit. The color proof generation section also expands the original data into raster data using a large number of fonts, etc., and an enormous number of fonts need not be provided at the transfer destination. Thus, at the transfer destination, an expensive apparatus for performing color conversion processing and expanding original data into raster data is not required and a skilled operator is not needed either and the color proof reproduced in precise color can be provided. Thus, for example, if the color proof generation section and communication section are placed in any of the printed matter design and production department, the orderer, the printing department after plate making, etc., printed matter of the same hue or tint can also be provided in other departments and the orderer, and color proofreading work can be advanced smoothly. Trouble of a discrepancy between the color in the production process and the actual printed matter color or the like can also be prevented from occurring.

Specification of the output unit and input of the original data can be executed through attached instruction section or can be received via the network from an external system. In the output unit for transferring the provided raster data, the reproduced color may vary with time. To correct such color change with time, for example, a color sample is output from the output unit at some timing and calibration at the color conversion time in the color proof generation section can be executed using the color sample. If the output unit has a function of transmitting calibration information indicating color reproduction change with time, calibration at the color conversion time can be executed based on the calibration information. Accordingly, whenever the output unit prints out, a color proof reproduced in precise color can be provided.

To check whether or not precise color reproduction is actually accomplished on the output unit, for example, when the output unit prints out, color reproduction parameter information at the time may be returned. The color proof generation section compares the returned parameter information with the parameter at the color conversion processing time, determines whether or not the color conversion processing is adequate, and outputs the determination result. Accordingly, the color proof generation section can know whether or not the raster data sent to the output unit is printed out as precise color reproduction.

Further, according to the invention, there is provided a color image processing system using a color image processing apparatus comprising a plurality of processing systems connected by a network, wherein at least one of the plurality of processing systems is used as a center and wherein the center has a color proof generation section for performing color conversion processing responsive to the output unit in the processing system for outputting the color image for original data on which the color image is based, and expanding the original data into raster data. Accordingly, an expensive apparatus for performing color conversion processing and expanding original data into raster data is not required and a skilled operator is not needed either in any processing system other than the center and a color proof reproduced in precise color can be provided in any processing systems containing the output unit, as described above. A plurality of the centers may exist so that one of them can be selected. A processing system of a third party other than business parties concerned may serve as the center.

In the invention, in the center server, one or more pieces of color conversion information set so that the color, when each output unit installed in a client system produces output based on original data, becomes the target color are previously stored in a one-to-one correspondence with the output units. The center server receives the original data and an instruction information specifying the output unit from the client system, performs color conversion processing for the original data using the color conversion information corresponding to the instruction information, and transfers the original data after undergoing the color conversion processing in accordance with the instruction information. If the output unit in the client system produces output based on the transferred original data after undergoing the color conversion processing, the output color matches the target color because conversion is made so that the image color becomes the target color. Alternatively, the center server transfers the color conversion information corresponding to the instruction information together with the original data to the output unit in the client system. The output unit in the client system performs color conversion processing for the original data based on the transferred color conversion information and produces output. The color conversion information is provided for converting the original data so as to provide the target color and thus the output color matches the target color. Therefore, if the target color is matched with the reproduced color on a proof, the color of the image output from the output unit always matches the proof color.

For example, to print out the original data prepared in the production company on the printer installed in the client, the original data is sent to the center server for performing color conversion processing using the color conversion information corresponding to the printer installed in the client. Alternatively, the color conversion information is received from the center server and the color conversion processing is performed in the printer. Then, if the original data after undergoing the color conversion processing is printed out on the printer installed in the client, an image is reproduced in the same color as the proof. Therefore, it is made possible for the client to obtain the image reproduced in almost the same color as the proof without preparing films, PS plates, etc., and without the need for installing an expensive apparatus, and it is made possible to conduct color proofreading using the proof based on output of the printer installed in the client.

For example, to print out the original data prepared in the production company on the printer installed in the production company, a similar manner is also applied. The original data is sent to the center server for performing color conversion processing using the color conversion information corresponding to the printer installed in the production company. Then, if the original data after undergoing the color conversion processing is printed out on the printer installed in the production company, an image is reproduced in the same color as the proof. Therefore, the comprehensive layout in the related art can be used as a proof intact and up to the final color proofreading can be accomplished.

Further, color proofreading similar to that using a proof on the printer installed in the production company or the client is executed, whereby it becomes unnecessary to output a proof using a flatbed proofreading machine, etc., consuming a time at the plate making time and the need for again preparing films, PS plates, etc., from beginning based on proofreading is eliminated; it is made possible to reduce the time and the costs.

The color reproduced on a proof often varies from one used printer to another. To cope with such a case, color conversion information can be provided for each target color corresponding to the reproduced color on a proof corresponding to a plurality of printers as target colors and color conversion processing can be performed using the color conversion information corresponding to the information specifying the output unit and the information specifying the target color.

Pieces of color conversion information indicating a plurality of ranks corresponding to the color conversion accuracy are provided and the rank information together with the information specifying the output unit as the instruction information is sent from the client system to the center server, whereby color conversion processing corresponding to rank can be performed. Accordingly, the color conversion processing with the color conversion accuracy responsive to the printed matter preparation stage can be performed and, for example, the color conversion accuracy is degraded at the initial stage of design, so that the processing can be speeded up and the processing load can be lessened.

Further, the color conversion information provided in the center server is previously downloaded into the client system and when the center sever is requested to perform color conversion processing for the original data, the color conversion information corresponding to the output unit can also be sent to the center server and color conversion processing can also be performed in the center server using the color conversion information.

Further, the color image processing system can also be configured so that the original data is expanded into raster data in the center server and the provided raster data is transferred as the original data after undergoing color conversion processing. For example, if the output unit installed in the client system cannot produce precise output because of no fonts, etc., the original data is expanded into raster data in the center server, whereby it is made possible to reproduce a printed matter image.

A charge is made for such color conversion processing, expanding processing into raster data, or a combination thereof, whereby it is made possible to establish color conversion processing service as business.

However, it will become impossible to guarantee color match with the passage of time. Then, in the invention, color management in each output unit is conducted in the center server. For example, the output unit or the client system in which the output unit is installed may have a calibration function for adjusting a color reproducibility of the output unit. In such a case, the color reproducibility change with time can be overcome by the calibration function of the output unit. The information at the calibration time is also transferred to the center server, so that the color reproducibility of the output unit can be managed in the center server. For example, the color conversion information can be corrected as required based on the information at the calibration time received from the client system. Accordingly, the optimum color conversion processing can always be performed. When the calibration is not conducted during a predetermined time period in the output unit, the client system in which the output unit is installed can be warned. Accordingly, color difference, etc., caused by the reproduced color change with time can be prevented. Further, the information at the calibration time received from the client system is analyzed and if the color reproducibility of the output unit is out of a predetermined criterion, the client system in which the output unit is installed can be warned. If the reproduced color varies, for example, as a color shift occurs beyond the range in which the color can be adjusted by the calibration function, a warning message indicating the fact can be previously given.

For example, if calibration cannot be conducted in the output unit or the client system in which the output unit is installed, a color measurement sample is output on the output unit and the color conversion information set corresponding to the output unit is corrected based on the color measurement sample. Accordingly, if the color reproduction change with time occurs in the output unit, the center server performs color conversion processing in response to the change and thus the color reproducibility can always be guaranteed. Also in this case, when the color conversion information correction processing using the color measurement sample for the output unit is not executed during a predetermined time period, the client system in which the output unit is installed can be warned, and if it is determined from the color measurement sample that the color reproducibility of the output unit outputting the color measurement sample is out of a predetermined criterion, the client system in which the output unit is installed can be warned. The color measurement samples are classified into a plurality of ranks, so that the calibration accuracy can be ranked. It is also made possible to conduct calibration responsive to the color conversion accuracy.

The color management in each output unit is thus conducted in the center server, whereby the color reproducibility can always be guaranteed. The color management situation of the output unit can be returned to the client system in response to inquiry sent from the client system. A charge can also be made for either or both of correcting the color conversion information and management processing of warning, etc. Accordingly, it is made possible to establish color reproducibility management as business.

BRIEF DESCRIPTION OF THE DRAWINGS

FIG. 2 is a schematic representation of an example of a composition of a color conversion information storage section.

FIG. 5 is a schematic diagram of another example of a composition of the color conversion information storage section.

DETAILED DESCRIPTION OF THE PREFERRED EMBODIMENTS

First Embodiment

Figure 1:
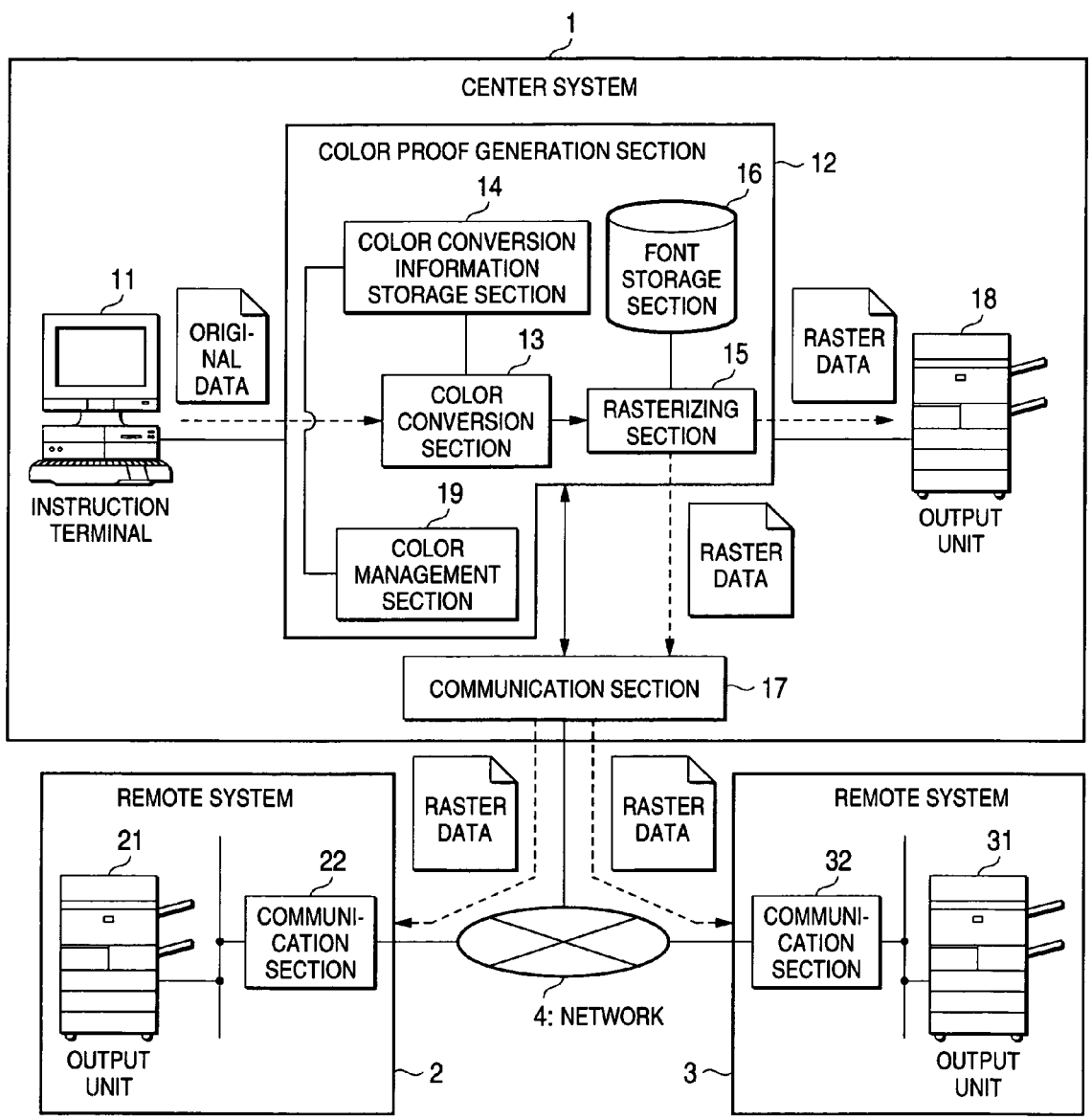
FIG. 1 is a block diagram to show a first embodiment of a color image processing system using a color image processing apparatus according to the invention.

FIG. 1 is a block diagram to show a first embodiment of a color image processing system using a color image processing apparatus according to the invention. In the figure, numeral 1 denotes a center system (color image processing apparatus), numerals 2 and 3 denote remote systems, numeral 4 denotes a network, numeral 11 denotes an instruction terminal, numeral 12 denotes a color proof generation section, numeral 13 denotes a color conversion section, numeral 14 denotes a color conversion information storage section, numeral 15 denotes a rasterizing section, numeral 16 denotes a font storage section, numeral 19 denotes a color management section, numerals 17, 22, and 32 denote communication sections, and numerals 18, 21, and 31 denote output units. In the color image processing system shown in FIG. 1, the center system 1 and the remote systems 2 and 3 are connected by the network 4. For example, the color image processing system can be constructed by installing the center system 1 in a production company and the remote systems 2 and 3 in an orderer and a printing company. Of course, the number of the remote systems that can be connected to the center system 1 is not limited to two and any number of remote systems may be connected. Every communication form regardless of wired or radio, such as a telephone line, a satellite line, the Internet, and a LAN, can be used as the network 4. Further, not only one-to-one communications, but also one-to-multiple broadcast-type communications are included.

The center system 1 has the instruction terminal 11, the color proof generation section 12, the communication section 17, the output unit 18, etc., which may be connected in any form and can be implemented as a system connected by a LAN, etc., for example. The instruction terminal 11 is used to give an instruction for inputting original data to the color proof generation section 12 and specify the output unit to print out. In the example, the output unit 18, the output unit 21 in the remote system 2, the output unit 31 in the remote system 3, or the like can be specified. More than one instruction terminal 11 maybe connected. The instruction terminal 11 need not be a dedicated terminal and may be a terminal installing software that can give an instruction to the color proof generation section 12. Further, the instruction terminal 11 may be implemented as an operation section of the output unit 18, the color proof generation section 12 may function in the instruction terminal 11, or the instruction terminal 11, the color proof generation section 12, and the output unit 18 may be in one piece. If the instruction terminal 11 is placed in the output unit 18, workability can be more enhanced.

The original data is arbitrary and may be, for example, code data using PDF, html/XML, etc., prepared in the instruction terminal 11 or any other computer, bit map data prepared using a graphics function, an image read through an image reader, or a mixture thereof. The original data may be stored, for example, in the instruction terminal 11 or any other computer, read, sent to the color proof generation section 12 through LAN, etc., or supplied through the network from the outside or using a portable record media such as floppy disk. Readers of the storage media as well as an image reader may be added to the instruction terminal 11.

The output unit 18 prints out based on raster data prepared in the color proof generation section 12, so that a color proof can be provided in the center system 1. There may be a system to which the output unit 18 is not connected, or two or more output units may be connected. The instruction terminal 11 may be implemented using operation and display sections of the output unit 18.

The color proof generation section 12 has the color conversion section 13, the color conversion information storage section 14, the rasterizing section 15, the font storage section 16, the color management section 19, etc. The color conversion section 13 takes out the color conversion information corresponding to the output unit specified as the output target through the instruction terminal 11 from the color conversion information storage section 14 and performs color conversion processing for original data according to the color conversion information. The color conversion information storage section 14 stores the color conversion information provided in a one-to-one correspondence with the output units. The color conversion information is set so that the output color of the output unit based on the original data becomes the target color. The target color can be, for example, the color reproduced on a proof used hitherto. The output units differ in color reproducibility because of the print technology, machine property difference, etc., as described above. Thus, different color conversion information can be registered not only when the output units adopt different print technologies, but also when the output units differ in model although the same print technology is adopted. Further, if the output units are of the same model, the color conversion information can also be registered in the color conversion information storage section 14 for each output unit considering the machine property difference therebetween. To deal with such a case where no color conversion information is registered in the color conversion information storage section 14, the instruction terminal 11 can also be adapted to enter color conversion information. Thus, the color conversion section 13 acquires the color conversion information corresponding to the output unit to produce output from the color conversion information storage section 14 and performs color conversion processing based on the color conversion information. Therefore, the color conversion section 13 performs color conversion processing using the color conversion information corresponding to the output unit to produce output, whereby when the original data after undergoing the color conversion processing is output on the output unit, the image can be reproduced in almost the same color as the target color and color reproduction almost similar to that on a proof in the related art can also be accomplished.

FIG. 2 is a schematic diagram of an example of a composition of the color conversion information storage section 14. In the example shown in FIG. 2, the color conversion information is stored in a one-to-one correspondence with the output units and the target colors. For example, when the target color is target A and an image is output on the output unit 21 in the remote system 2, color conversion information a is used to execute color conversion. Likewise, when the target color is target A and an image is output on the output unit 31 in the remote system 3, color conversion information b is used to execute color conversion. Accordingly, the reproduced colors of the image output on the output unit 21, the image output on the output unit 31, and the printed image can be almost matched with each other.

Even when output is produced on the same output unit, for example, if the printer for finally printing printed matter differs, color conversion information such that color reproduction almost matches the target color responsive to the characteristic of the printer is used. For example, to output on the output unit 21 in the remote system 2, if the target color is target A, color conversion information a is used to execute color conversion; if the target color is target B, color conversion information c is used to execute color conversion. Accordingly, color reproduction responsive to the printer, etc., can be accomplished.

Each piece of color conversion information can be provided, for example, by outputting a sample image for color measurement on an output unit, measuring the color of the image with a color measuring instrument, etc., and comparing the color measurement value with the target color corresponding to the color patch. Such color conversion information is previously registered in the color conversion information storage section 14 in the center system 1. Arithmetic processing to provide such color conversion information can also be performed in the color proof generation section 12.

Referring again to FIG. 1, if an instruction to expand the original data into raster data is given as a part of instruction information or the received original data is in a data format in which the original data cannot be output on the specified output unit as it is, the color conversion section 13 passes the original data after undergoing color conversion processing to the rasterizing section 15, which then expands the original data into raster data. To expand the original data into raster data, font data stored in the font storage section 16 is used. A large number of fonts, special fonts, etc., are held in the font storage section 16 and expansion processing is performed, so that the need for holding expensive, large-capacity font data in each remote system is eliminated. If the received original data is raster data or the specified output unit is a unit capable of receiving and outputting data described by using a description language such as PDL or the like, the color conversion section 13 performs only color conversion processing for the color information in the original data and the rasterizing processing in the rasterizing section 15 described above need not be performed. If it is always unnecessary to expand the original data into raster data, the center system 1 may be configured without installing the rasterizing section 15.

In contrast, if an instruction only to expand the original data into raster data is given, it is also possible for the rasterizing section 15 to expand the original data into raster data without performing color conversion processing for the original data by the color conversion section 13. Further, if it is always unnecessary to perform the color conversion processing, the center system 1 may be configured without installing the color conversion section 13.

The raster data provided by the rasterizing section 15 is sent to the output unit specified through the instruction terminal 11. If the output unit 18 is specified, the raster data is sent to the output unit 18 in the center system 1 and a color proof is printed out from the output unit 18. If the specified output unit is the output unit 21 in the remote system 2 or the output unit 31 in the remote system 3, the raster data is transmitted to the remote system 2 or 3 via the communication section 17 through the network 4.

Further, if the remote system comprising an output unit can transmit calibration information of the output unit to the center system, the communication section 17 receives the calibration information sent from the remote system and passes the calibration information to the color management section 19 and accepts various alarms issued from the color management section 19 to the remote system and inquiries about the output unit state, referred to the color management section 19 and transmits response from the color management section 19.

The remote system 2, 3 is provided with the communication section 22, 32 for communicating with the center system 1 and the output unit 21, 31. In the remote system 2, the raster data sent from the center system 1 is received at the communication section 22 and can be printed out on the output unit 21 for providing a color proof. Likewise, in the remote system 3, the raster data sent from the center system 1 is received at the communication section 32 and can be printed out on the output unit 31 for providing a color proof. The output units 21 and 31 may be units using various print technologies, such as electrophotographic and ink jet technologies, and may be of any models.

The operation for printing out a color proof from the output unit 21 in the remote system 2 based on the original data prepared in the center system 1 in the first embodiment of the color image processing apparatus of the invention will be discussed.

Before color conversion processing is performed, the color conversion information corresponding to the output unit 21 in the remote system 2 needs to be stored in the color conversion information storage section 14 in the center system 1. The color conversion information can be provided, for example, by outputting a sample image for color measurement on the output unit 21, measuring the color of the image with a color measuring instrument, etc., and comparing the color measurement value with the target color, as described above. At this time, pieces of color conversion information corresponding to a plurality of ranks (described later with reference to FIG. 5) may be prepared. Such color conversion information pieces are previously found for a plurality of target colors and in addition, the color measurement data of the image of a color measurement sample is retained and when conversion to a new target color is required and color conversion information becomes necessary, it may be prepared. The information concerning the target colors is retained in the center system 1 and is used when a new color measurement sample is brought into the center system 1 and color conversion information is corrected.

Original data and the output unit 21 in the remote system 2 as the output destination are specified through the instruction terminal 11 in the center system 1. The color conversion section 13 in the color proof generation section 12 acquires the color conversion information corresponding to the output unit 21 specified as the output destination (further, the target color, rank) from the color conversion information storage section 14 or directly from the instruction terminal 11 and performs color conversion processing for the original data according to the obtained color conversion information. Further, the original data after undergoing the color conversion processing is passed to the rasterizing section 15, which then expands the original data into raster data using the font stored in the font storage section 16. Since the output unit 21 in the remote system 2 is specified as the output unit, the raster data provided by the rasterizing section 15 is transferred from the communication section 17 through the network 4 to the remote system 2.

The raster data sent from the center system 1 is the data for which the color conversion processing is performed in the color conversion section 13 corresponding to the output unit 21 and thus may be printed out intact on the output unit 21. Accordingly, a color proof on which color reproduction is precisely executed can be provided.

In a similar manner, a color proof is printed out from the output unit 31 in the remote system 3 based on the original data prepared in the center system 1. Also in this case, the raster data for which color conversion processing is performed in the color conversion section 13 corresponding to the output unit 31 is sent to the remote system 3 and thus if the raster data is printed out intact on the output unit 31, a color proof on which color reproduction is precisely executed can be provided. Further, if the output unit 18 in the center system 1 is specified as the output unit, the raster data provided by the rasterizing section 15 is transferred to the output unit 18 and a color proof is printed out on the output unit 18. Also in this case, the color conversion section performs color conversion processing corresponding to the output unit 18 and thus a color proof on which color reproduction is precisely executed can be provided similar to the raster data is printed out on the output unit 21 or 31.

Figure 8:
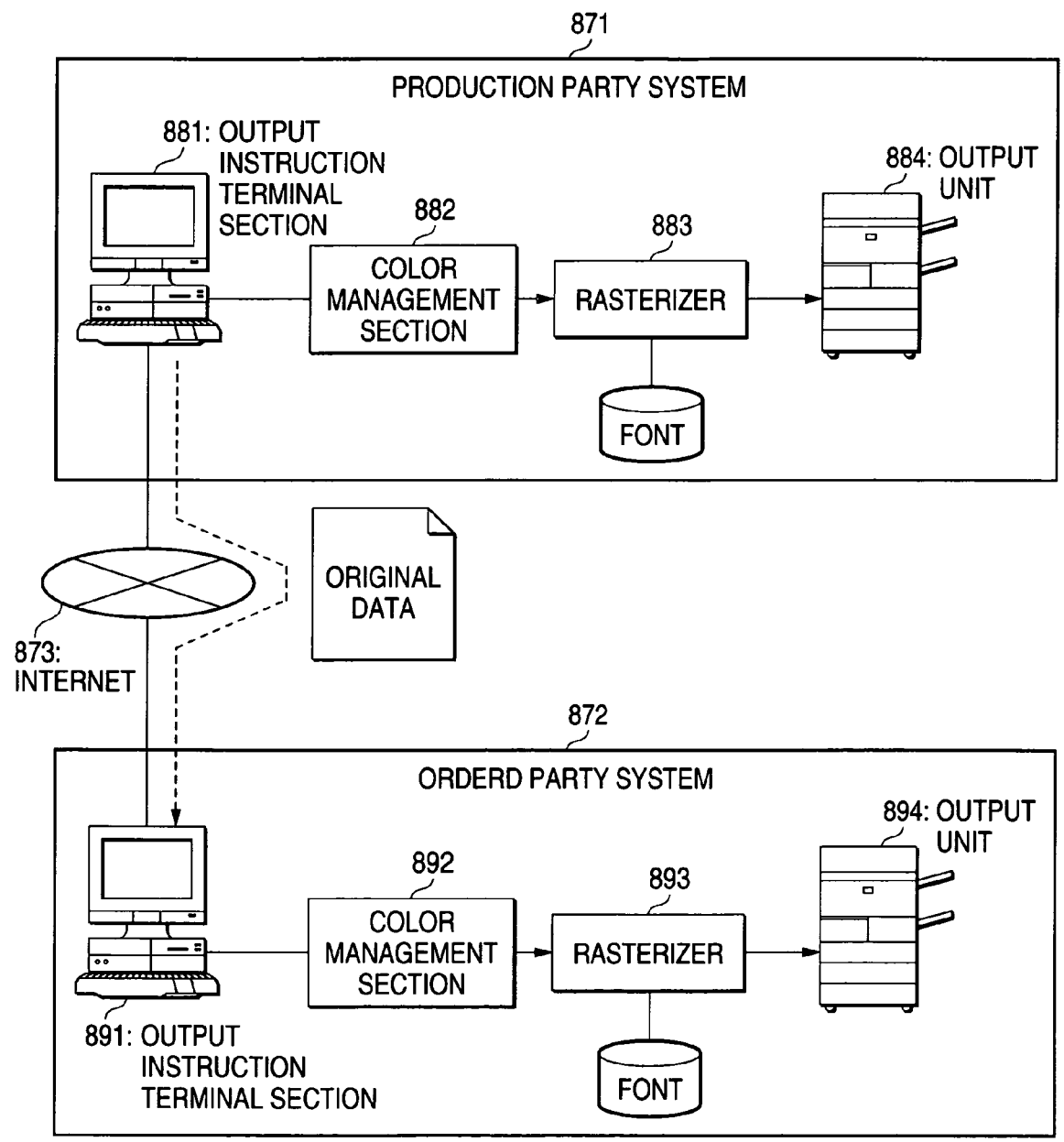
FIG. 8 is a schematic diagram of an example of a color image processing system using a color image processing apparatus in a related art.

Since the color conversion processing responsive to each output unit is performed in the center system 1 as described above, the printed-out color proofs are reproduced in almost the same color on any output units including the printer in the center system 1. For example, in the production process of general printed matter previously described with reference to FIG. 9, the color image processing system is constructed with the systems in the client 961, the plate-making company 963, etc., as the remote systems and the system in the production company 962 as the center system 1, whereby the comprehensive layout 972 prepared in the production company 962 can be output on the printer installed in the client 961. In this case, as color conversion processing is performed in the center system 1, color conversion processing responsive to the printer installed in the client 961 and the used printer 991 is performed and thus color reproduction almost equivalent to that on the proof 986 prepared in the plate-making company 963 can also be provided on the printer installed in the client 961. Thus, the comprehensive layout 972 prepared in the production company 962 can be handled like the proof 986 and color proofreading can also be conducted at the stage of the comprehensive layout 972 to some extent. At this time, the color proof generation section need not be installed in the remote system as compared with the system in the related art shown in FIG. 8, so that an expensive color conversion apparatus need not be installed for each output unit in the remote system and color conversion processing can be performed with high accuracy at low costs. Therefore, as compared with the case where color proofreading is conducted with the proof 986 after the films 982, the PS plates 984, etc., are prepared as in the related art, the number of times proofreading is performed using the proof 986 is decreased exceptionally, the correction cost and time can be reduced greatly, and the manpower, etc., can also be made efficient with the visits of each sales representative lessened. Of course, if the client 961 consents to the design, color, etc., at the stage of the comprehensive layout 972, up to printing can be executed without preparing the proof 986 and the cost, time, etc., can be more reduced. Thus, according to the invention, printed matter production can be advanced using images with colors almost equivalently reproduced in any step of the printed matter production process.

If a remote system is added or an additional output unit is installed in any remote system or the existing output unit is replaced with another one, color conversion information corresponding to the added or replacing output terminal may be registered in the color conversion information storage section 14 and it may be made possible to specify the added or replacing output unit through the instruction terminal 11. Of course, the color conversion information can also be deleted.

As described above, using the color image processing apparatus according to the invention, the color almost similar to the target color can be reproduced on each output unit with the reproduced color at the printing time as the target color, for example. However, to provide precise color reproduction, the color conversion processing amount is large. However, strict color reproducibility may not be required depending on the preparation stage of printed matter, for example, at the proofreading stage of initial layout design, etc. In such a case, color conversion processing with a large load need not necessarily be performed. To deal with such a case, it is advisable to rank color conversion processing.

FIG. 5 is a schematic diagram of another example of the composition of the color conversion information storage section 14. The accuracy of color conversion processing is determined by the color conversion information preparation method, the color conversion processing method, etc., to some extent. Thus, to rank the color conversion processing, it is possible to previously store the color conversion information responsive to each rank in the color conversion information storage section 14. In the example shown in FIG. 5, the color conversion information is subdivided into a plurality of ranks for storage in a one-to-one correspondence with the output units and the target colors. For example, assuming that rank 1 is the highest accuracy, at the initial stage of printed matter preparation, a large rank value may be specified for executing color conversion processing. As the process approaches determination of color, etc., a small rank value may be specified for executing color conversion processing and when color proofreading, etc., is conducted or output is produced in the plate-making company or the printing company, rank 1 may be specified for executing color conversion processing. As for the color conversion information responsive to the rank of the color conversion accuracy, for example, when a color patch image is used to prepare the color conversion information, the accuracy can be ranked according to the number of used color patches.

In the example, the color conversion information responsive to the plurality of ranks is stored in a one-to-one correspondence with the output units and the target colors, but the color conversion information with low color conversion accuracy, for example, can also be made common for use to some extent.

To thus rank the color conversion processing, if color conversion processing with low color conversion accuracy is performed, the load of the center system 1 can be lessened. Of course, the color image processing system can also be constructed without ranking the color conversion information. If the target color is fixed one, the color conversion information of each target color is not needed.

If the output unit has a color conversion processing function using color conversion information, the center system 1 may transfer the color conversion information corresponding to instruction information together with the original data to the output unit without performing color conversion processing. In this case, color conversion processing is performed in the output unit in accordance with the color conversion information sent from the center system 1. Also in this case, the color conversion information is information set so as to provide the same output color as the target color in the output unit and thus if color conversion processing is performed and output is produced, almost the same color as the target color can be reproduced. Transferring the color conversion information to the output unit or performing color conversion processing in the center system 1 can be selected in response to the output unit. If the output unit does not have the function of retrieving the color conversion information and performing color conversion processing, color conversion processing may be performed in the center system 1. Even if the color conversion information is transferred to the output unit, rasterizing processing for the original data may be performed in the center system 1.

As described above, using the color image processing apparatus according to the invention, images reproduced in almost equivalent colors can be provided on any output units. However, images reproduced in almost equivalent colors can be provided on any output units when a color measurement sample used as the basis for preparing the color conversion information corresponding to each output unit is output; the color reproducibility is not guaranteed with change of the output unit with time, replacement of the parts, etc. Of course, color change with time is moderate unless a failure occurs, and if calibration processing is executed at reasonable intervals, the color reproducibility can be almost guaranteed. Therefore, reproduced color calibration processing for each output unit may be performed within a predetermined time period. Of course, whenever a fault occurs or the parts are replaced, calibration processing may be performed.

Figure 3:
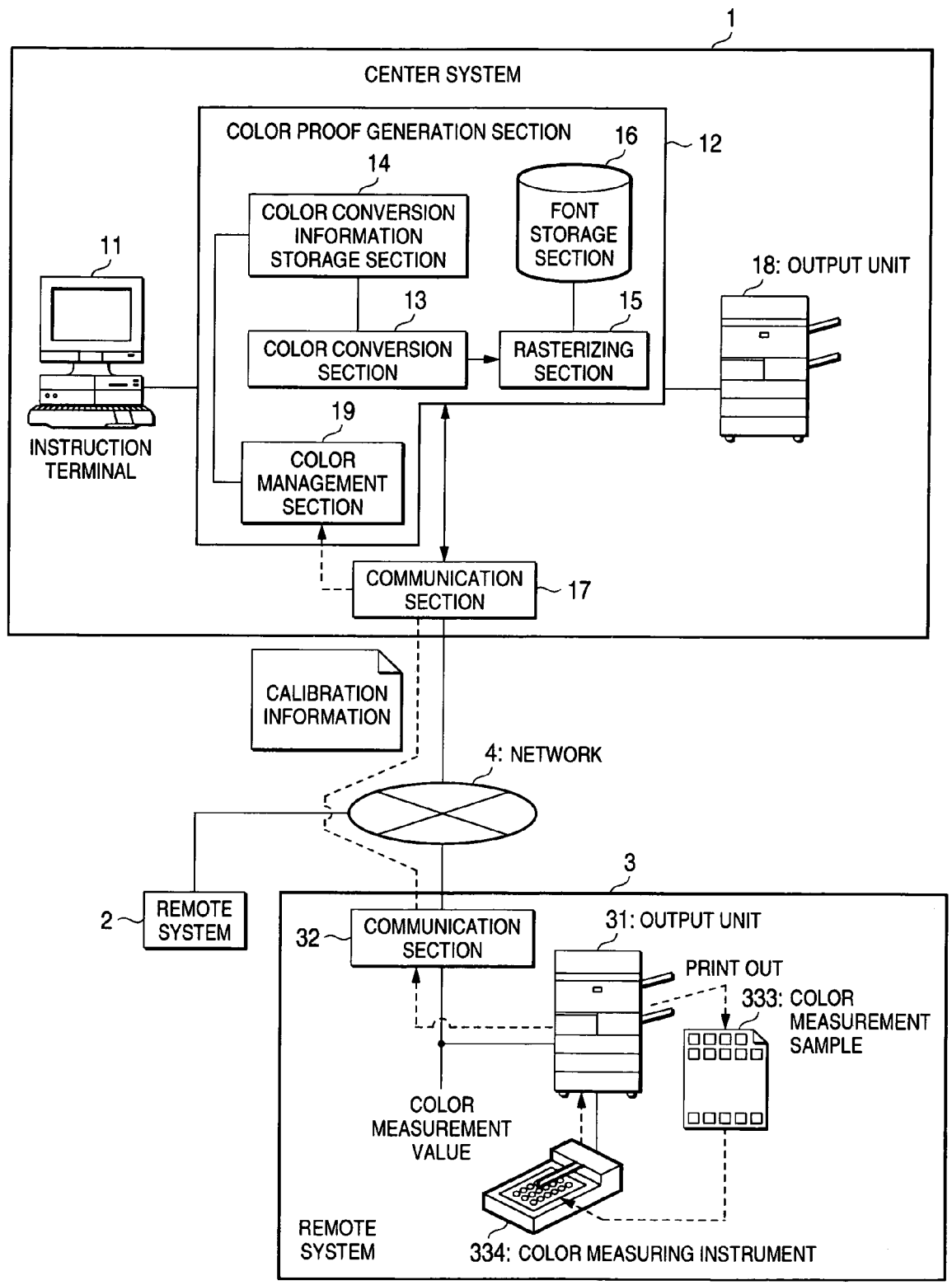
FIG. 3 is a schematic diagram of an example of the operation when calibration processing can be performed in a remote system.

FIG. 3 is a schematic diagram of an example of the operation when calibration processing can be performed in the remote system. In the figure, numeral 333 denotes a color measurement sample and numeral 334 denotes a color measuring instrument. Here, the operation when calibration processing of the output unit 31 can be performed in the remote system 3 will be discussed briefly. In this case, calibration processing is performed in the remote system 3 and thus basically the color conversion information in the center system 1 need not be changed. However, unless it can be checked that calibration processing is actually performed, the color reproducibility cannot be guaranteed, and the calibration processing must be performed correctly. Thus, the center system 1 checks to ensure that calibration processing is actually performed and checks the calibration processing for validity to some extent.

To perform the calibration processing, for example, the color measurement sample 333 having a predetermined color patch is printed out on the output unit 31, the color of the color patch drawn on the color measurement sample 333 is measured with the color measuring instrument 334, and the color measurement value is input to the output unit 31 or any other computer. Conversion data for inversely correcting the variation in the color reproducibility in the output unit 31 is computed based on the color measurement value of the color measuring instrument 334, and is registered in the output unit 31. To later print out, the registered conversion data is used to execute color conversion processing.

If the calibration processing is thus performed, the date and time of the calibration processing, the color measurement value of the color measuring instrument 334, and the like are retained as calibration information. When a scheduled inquiry is received from the center system 1, the calibration information is transferred to the center system 1. Alternatively, when the calibration processing has been performed, the calibration information is transferred to the center system 1. Particularly, after the parts are replaced or a repair is made, there is a possibility that the color may be changed largely and thus immediately the calibration information should be transferred to the center system 1.

If the center system 1 receives the calibration information returned responding to the inquiry made for the remote system 3, the executing date and time of the calibration processing is checked and whether or not the time interval between the last calibration processing and the current calibration processing is equal to or longer than a predetermined time period is determined. If the time interval is equal to or longer than the predetermined time period, the center system 1 warns the remote system 3 to execute calibration processing. At this point in time, the management information in the color management section 19 is changed to a condition to an effect that the color reproducibility cannot be guaranteed because of the passage of the predetermined time period. At the point in time when the predetermined time period has elapsed since the date and time of the last calibration processing rather than when the calibration information is received from the remote system 3, the center system 1 may warn the remote system 3 and change the management information.

If the received calibration information is newer than the previously received calibration information, the executing date and time of the calibration processing are updated. The color measurement value is analyzed and whether or not the color reproducibility is out of a predetermined criterion is determined. If it is determined that the color reproducibility is out of the predetermined criterion, the center system 1 warns the remote system 3 and informs the remote system 3 that the current condition is a condition in which the color reproducibility cannot be guaranteed if calibration processing is performed. In such a case, often it becomes necessary to maintain the output unit 31.

If the remote system 3 sends calibration information to the center system 1 voluntarily, the center system 1 updates the date and time of the last calibration processing to the date and time in the received calibration information. The center system 1 analyzes the color measurement value and determines whether or not the color reproducibility is out of the predetermined criterion, as described above.

If the color measurement value of the received calibration information is within the criterion, it is determined that the color reproducibility is guaranteed, and the management information in the color management section 19 is set to the condition to the effect that the color reproducibility is guaranteed. If precise color reproduction cannot be conducted by only calibration processing of the output unit 31, the color conversion information corresponding to the output unit 31 may be corrected based on the received calibration information.

Figure 4:
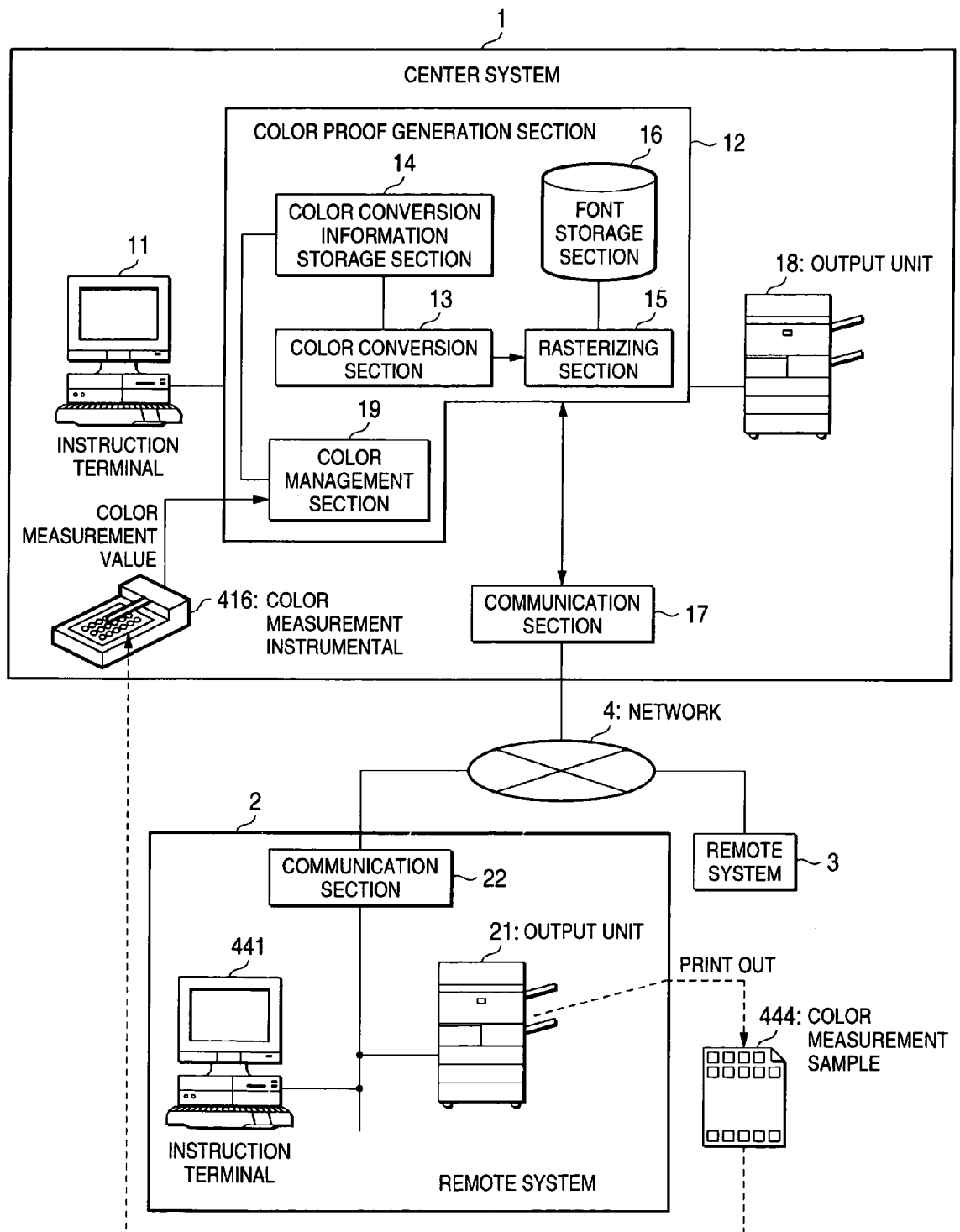
FIG. 4 is a schematic diagram of an example of an operation when a remote system or an output unit does not have a calibration function.

FIG. 4 is a schematic diagram of an example of the operation when the remote system or the output unit does not have the calibration function. In the figure, numeral 416 denotes a color measuring instrument and numeral 444 denotes a color measurement sample. Here, the operation when neither the remote system 2 nor the output unit 21 can perform calibration processing of the output unit 21 will be discussed briefly. If calibration processing of the output unit cannot be performed in the remote system, the center system 1 performs equivalent calibration processing.

First, the color measurement sample 444 having a predetermined color patch is printed out on the output unit 21. The color measurement sample 444 is brought into or sent to the management company of the center system 1 and the color of the color patch drawn on the color measurement sample 444 is measured with the color measuring instrument 416 installed in the center system 1. The color measurement value of the color measuring instrument 416 is input to the color management section 19 or any other computer and considering the variation in the color reproducibility in the output unit 21, the color conversion information is corrected based on the color measurement value. Alternatively, the color conversion information including the variation in the color reproducibility in the output unit 21 may be again computed for correcting the color conversion information. The corrected color conversion information is stored in the color conversion information storage section 14. The output date and time of the color measurement sample 444 or the correction processing date and time of the color conversion information are retained.

Thus, if the output unit 21 or the remote system 2 does not have the calibration function of the output unit 21, the center system 1 corrects the color conversion information in response to the variation in the color in the output unit 21 and performs calibration processing. Such calibration processing is performed at predetermined time intervals or whenever the parts are replaced or a repair is made, whereby color conversion processing responsive to the color reproduction state of the output unit 21 can always be performed at the color conversion time and the color reproducibility can be guaranteed.

The calibration processing can be performed with the rank responsive to the color conversion accuracy. For example, the color patches drawn on the color measurement sample 444 are ranked and all color patches are used to execute calibration processing in the rank for performing color conversion processing with high accuracy. In the rank for performing color conversion processing with low accuracy, calibration processing can be executed by using some of the color patches. Thus, the calibration processing accuracies can be ranked depending on the number of the used ones of the color patches drawn on the color measurement sample. Such ranking can be performed in accordance with specification of the calibration accuracy from the user or in the configuration wherein the color conversion information can be set for each rank as shown in FIG. 5, the calibration processing with the color conversion accuracy in each rank can be performed as the number of the used color patches is varied.

The color management section 19 analyzes the result of measuring the color of the color measurement sample 444 output from the output unit 21 with the color measuring instrument 416 and determines whether or not the color reproducibility in the output unit 21 is out of a predetermined criterion. If the color reproducibility is within the predetermined criterion, the color conversion information is corrected as described above. On the other hand, if it is determined that the color reproducibility is out of the predetermined criterion, the color management section 19 warns the remote system 2 and informs the remote system 2 that the current condition is a condition in which the color reproducibility cannot be guaranteed if calibration processing is performed. The color management section 19 also monitors the elapsed time since the executing date and time of the last calibration processing and if calibration processing using the next color measurement sample 444 is not performed during a predetermined time period, the color management section 19 warns the remote system 2 to send the color measurement sample 444 to the center system 1 after the expiration of the predetermined time period. If the color management section 19 warns the remote system 2, it changes the management information to the condition to the effect that the color reproducibility cannot be guaranteed.

Thus, the color management section 19 can always provide agreement between the reproduced colors by performing color conversion processing with high accuracy in response to color change of the output unit with time or color change caused by replacing the parts or making a repair regardless of whether or not the output unit or the remote system in which the output unit is installed has the calibration function.

If calibration processing is performed in response to the change of the output unit with time as described above, correct color reproduction is always conducted. However, if such calibration processing is too late and large color change occurs in the output unit, correct color reproduction is not conducted. When the output unit is replaced with another one, if an instruction to output a color proof is given without changing the color conversion information storage section 14 accompanying replacement of the output unit, a color proof whose color is not precisely reproduced is output from the output unit. In such a case, the situation can also occur in which the transmitting party is not aware that a color proof whose color is not precisely reproduced is output at the receiving party. To prevent such a situation, for example, it is possible for the output unit 21, 31 in the remote system 2, 3 printing out a color proof to return the color conversion information at the printing-out time to the center system 1. Upon reception of the color conversion information through the communication section 17, the center system 1 can collate the color conversion information in the color conversion information storage section 14 used to prepare the raster data of the color proof transmitted with the color conversion information received from the remote system 2, 3 to determine whether or not color reproduction is conducted correctly. The determination result can be output to or displayed on the instruction terminal 11, any other terminal, the output unit 18, etc., for example. Of course, an error message may be output only when it is determined that color reproduction is conducted incorrectly.

Thus, it is made possible for the transmitting party to know the fact that precise color reproduction is not conducted on the output unit at the receiving party. Of course, the above-described method is an example and the system can be configured so that the transmitting party can know whether or not color reproduction is correctly conducted at the receiving party according to various methods. Such determination is made at several stages and, for example, the center system can previously warn the remote system that the calibration time will soon come, and then can output an error message indicating that color reproduction is not correct. Of course, not only such information as to whether or not color reproduction is correct, but also information as to what condition (parameter, etc.,) the color proof is printed out under may be output.

Second Embodiment

Figure 6:
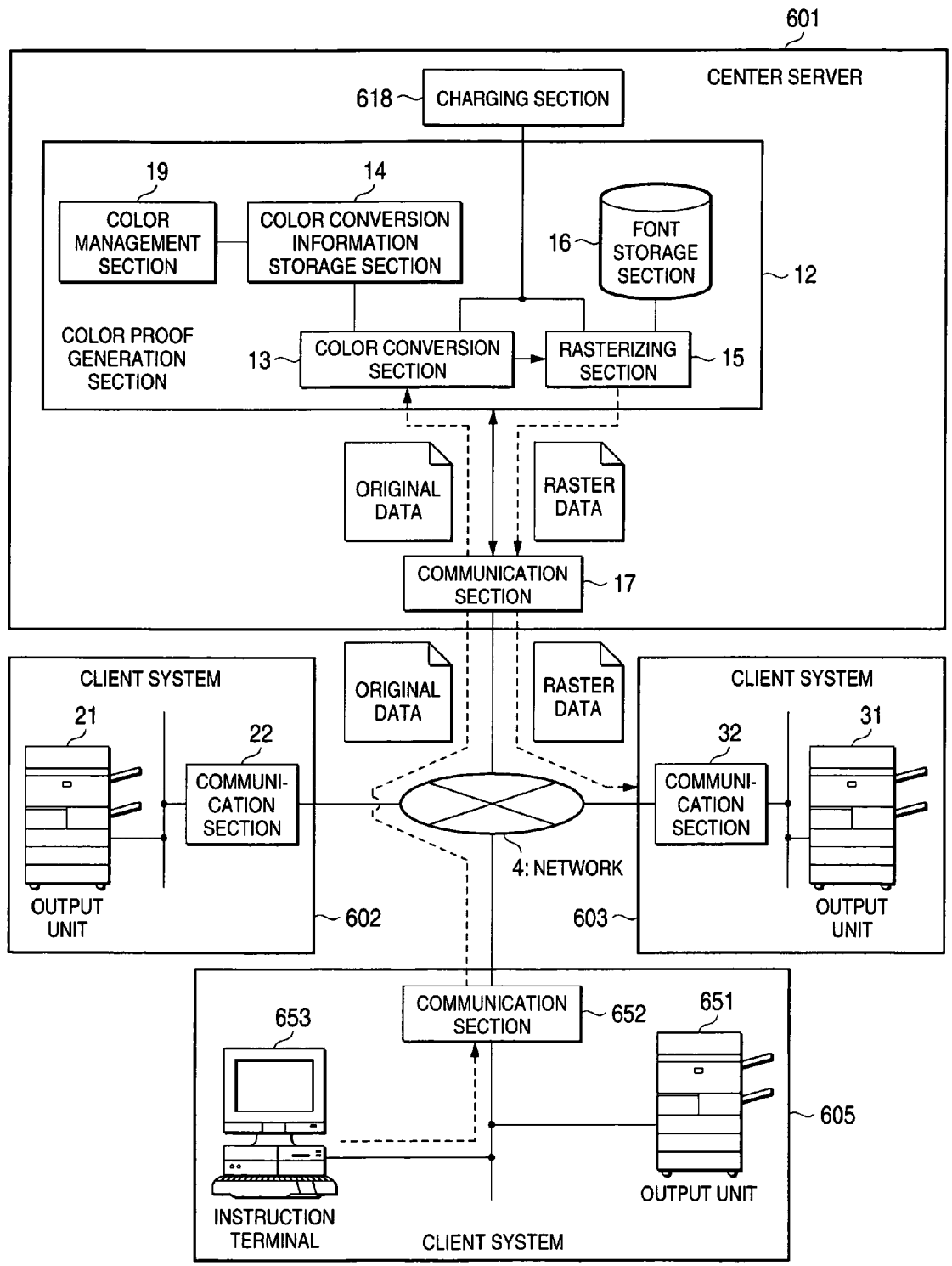
FIG. 6 is a block diagram to show a second embodiment of a color image processing system using a color image processing apparatus according to the invention.

FIG. 6 is a block diagram to show a second embodiment of a color image processing system using a color image processing apparatus according to the invention. Parts similar to those previously described with reference to FIG. 1 are denoted by the same reference numerals in FIG. 6 and will not be discussed again. In FIG. 6, numeral 601 denotes a center server (color image processing apparatus), numerals 602, 603, and 605 denote client systems, numeral 618 denotes a charging section, numeral 651 denotes an output unit, numeral 652 denotes a communication section, and numeral 653 denotes an instruction terminal. In the color image processing system shown in FIG. 6, the center server 601 and the client systems 602, 603, and 605 are connected by a network 4. For example, the color image processing system can be constructed by installing the client systems 602 and 603 in an orderer and a printing company and the client system 604 in a production company. Of course, the number of the client systems that can be connected to the center server 601 is not limited to three and any number of client systems can be connected. At least one of the client systems shall comprise an output unit. Every communication form regardless of wired or radio, such as a telephone line, a satellite line, the Internet, and a LAN, can be used as the network 4. The instruction terminal 653 may be a general computer and one or more client systems each having an instruction terminal such as the client system 605 may be able to be connected to the network 4.

The center server 601 receives original data and instruction information specifying the output unit by a communication section 17 through the network 4. The communication section 17 inputs the received original data and instruction information to a color conversion section 13, which then takes out the color conversion information corresponding to the output unit specified by the instruction information from a color conversion information storage section 14 and performs color conversion processing for the original data according to the color conversion information. Further, a rasterizing section 15 expands the original data after undergoing the color conversion processing into raster data while seeing font data in a font storage section 16. The raster data provided by the rasterizing section 15 is sent from the communication section 17 to the output unit specified by the instruction information and is output on the output unit specified by the instruction information. The output image is reproduced in almost the same color as the target color.

The original data is expanded into raster data while the font data stored in the font storage section 16 is used. A large number of fonts, special fonts, etc., are held in the font storage section 16 and expansion processing is performed, so that the need for holding expensive, large-capacity font data in each client system is eliminated. If the received original data is raster data or the specified output unit is a unit capable of receiving and outputting data described using a description language such as PDL or the like, the color conversion section 13 performs only color conversion processing for the color information in the original data and the rasterizing processing in the rasterizing section 15 described above need not be performed. If it is always unnecessary to expand the original data into raster data, the center server 601 may be configured without installing the rasterizing section 15.

In contrast, if an instruction only to expand the original data into raster data is given, it is also possible for the rasterizing section 15 to expand the original data into raster data without performing color conversion processing for the original data by the color conversion section 13. Further, if it is always unnecessary to perform the color conversion processing, the center server 601 may be configured without installing the color conversion section 13.

The charging section 618 charges for the color conversion processing of the color conversion section 13, the rasterizing processing of the rasterizing section 15, or a combination thereof. The color conversion processing requesting party or the party to whom the original data after undergoing the color conversion processing is transferred can be charged. Various charging systems on an as-used basis of the data size, the number of pages, the processing time, etc., on a fixed-price basis, or on a combined basis, such as an upper limit cap, can be applied. The charging system can also be switched in response to various settings as to whether or not the processing is urgent, whether or not a high-performance output unit (not shown) installed in the center server 601 is used for outputting, whether the image data is monochrome or color, etc.

The client systems 602, 603, and 605 are provided with communication sections 22, 32, and 652 for communicating with the center server 601 and can communicate with the center server 601 through the network 4. In the example, the client systems 602, 603, and 605 are also provided with output units 21, 31, and 651 and can output the original data undergoing color conversion processing performed by the center server 601. Thus, the client system 602 can receive the original data sent from the center server 601 at the communication section 22 and can print out the original data on the output unit 21. Likewise, the client system 603 or 605 can receive the raster data sent from the center server 601 at the communication section 32 or 652 and can print out the raster data on the output unit 31 or 651. Accordingly, the output unit 21, 31, or 651 can provide an image reproduced in a similar color to the target color. There may be a client system provided with no output unit, or two or more output units may exist in one client system. The output units need not adopt the same print technology or need not be of the same model and may adopt different print technologies or may be of different models. Of course, the output unit may be a display unit, etc.

The client system 605 is further provided with the above-mentioned instruction terminal 653. In the example, it is assumed that the client system 605 is a printed matter production system, and printed matter is designed, etc., and original data is prepared. At this time, the instruction terminal 653 may be used. The prepared original data together with instruction information specifying at least the output unit is sent from the instruction terminal 653 to the center server 601 and the center server 601 is requested to perform color conversion processing. For example, if the color information for each target color as shown in FIG. 2 is stored in the center server 601, specification of the target color is also sent to the center server 601 as the instruction information. For example, even to output to the output unit 651 in the client system 605, the original data may be sent to the center server 601 with specification of output to the output unit 651 to match the color reproducibility with the target color.

The original data is arbitrary and may be, for example, code data using PDF, HTML/XML, etc., prepared in the instruction terminal 653 or any other computer, bit map data prepared using a graphics function, an image read through an image reader, or a mixture thereof. The original data after undergoing color conversion may be in any format; when the center server 601 is requested to perform color conversion processing, the format can be specified or the data format in which data can be received for each output unit can be registered.

Next, an example of the operation of the color image processing apparatus of the invention will be discussed. Here, the operation of the color image processing apparatus for printing out an image on the output unit 31 in the client system 603 as instructed from the instruction terminal 653 in the client system 605 will be discussed briefly.

Before color conversion processing is performed, the color conversion information corresponding to the output unit 31 in the client system 603 needs to be stored in the color conversion information storage section 14 in the center server 601. The color conversion information can be provided, for example, by outputting a color patch image on the output unit, measuring the color of the image with a color measuring instrument, etc., and comparing the measured color with the target color of the same color patch image. Such color conversion information pieces are previously found for a plurality of target colors and in addition, the color measurement data of the color patch image is retained and when conversion to a new target color is required and color conversion information becomes necessary, it may be prepared. The color conversion information thus stored in the color conversion information storage section 14 can be later changed. It is advisable to change the color conversion information whenever necessary in response to change in the color reproducibility caused by change of the output unit with time, replacement of the parts, etc., for example.

Through the instruction terminal 653, an instruction is given for transmitting original data of printed matter and instruction information specifying the output unit 31 in the client system 603 as the output destination to the center server 601. Then, the communication section 652 transmits the original data and the instruction information through the network 4 to the center server 601. As for the specification of the output unit, for example, if only one output unit exists in each client system as shown in FIG. 6 or one representative output unit is set in each client system, only the client system to which the original data after undergoing color conversion processing is to be transferred may be specified.

The center server 601 receives the original data and the instruction information sent from the client system 605 at the communication section 17 and passes them to the color conversion section 13. The instruction information may also be retained in the communication section 17. The color conversion section 13 acquires the color conversion information corresponding to the output unit 31 specified as the output destination (further, the target color) in the instruction information and performs color conversion processing for the original data according to the obtained color conversion information. Further, if an instruction to expand the original data into raster data is given or if the received original data is in a data format that cannot be accepted in the output unit 31, the original data after undergoing the color conversion processing is passed to the rasterizing section 15, which then expands the original data into raster data.

For example, if the original data prepared in the client system 605 is data described in PostScript (registered trademark) and the output unit 31 can output the data in the data format intact, the color conversion section 13 performs only color conversion processing for color information in the original data and the original data after undergoing the color conversion processing is not expanded into raster data. If the output unit 31 cannot output the data in the data format without conversion or if an instruction to expand the original data into raster data is given as a part of instruction information from the client system 605, the rasterizing section 15 expands the original data after undergoing the color conversion processing into raster data.

The charging section 618 charges for the color conversion processing of the color conversion section 13. If the rasterizing section 15 rasterizes the original data, the charging section 618 can also charge for the rasterizing processing.

The original data after undergoing the color conversion processing of the color conversion section 13 or the original data expanded into raster data by the rasterizing section 15 is transferred through the communication section 17 to the client system 603 via the network 4. The client system 603 receives the original data transferred via the network 4 at the communication section 32 and sends the original data to the output unit 31. Accordingly, an image can be printed out from the output unit 31.

Thus, the original data prepared in the client system 605 undergoes color conversion processing in the center server 601 using the color conversion information corresponding to the output unit 31 and further is rasterized as required and the data is transferred to the output unit 31 in the client system 603 for output. At this time, the color conversion section 13 in the center server 601 performs color conversion processing so that almost the same color as the target color is reproduced upon output of the output unit 31 in the client system 603. Therefore, the image output on the output unit 31 in the client system 603 is reproduced in almost the same color as the target color; the image reproduced in a color almost similar to that when printed on a printer, for example, can be provided. To output the original data prepared in the client system 605 on the output unit 653 in the same client system 605 or print out on the output unit 21 in the client system 602, a similar manner can also be applied.

Figure 9:
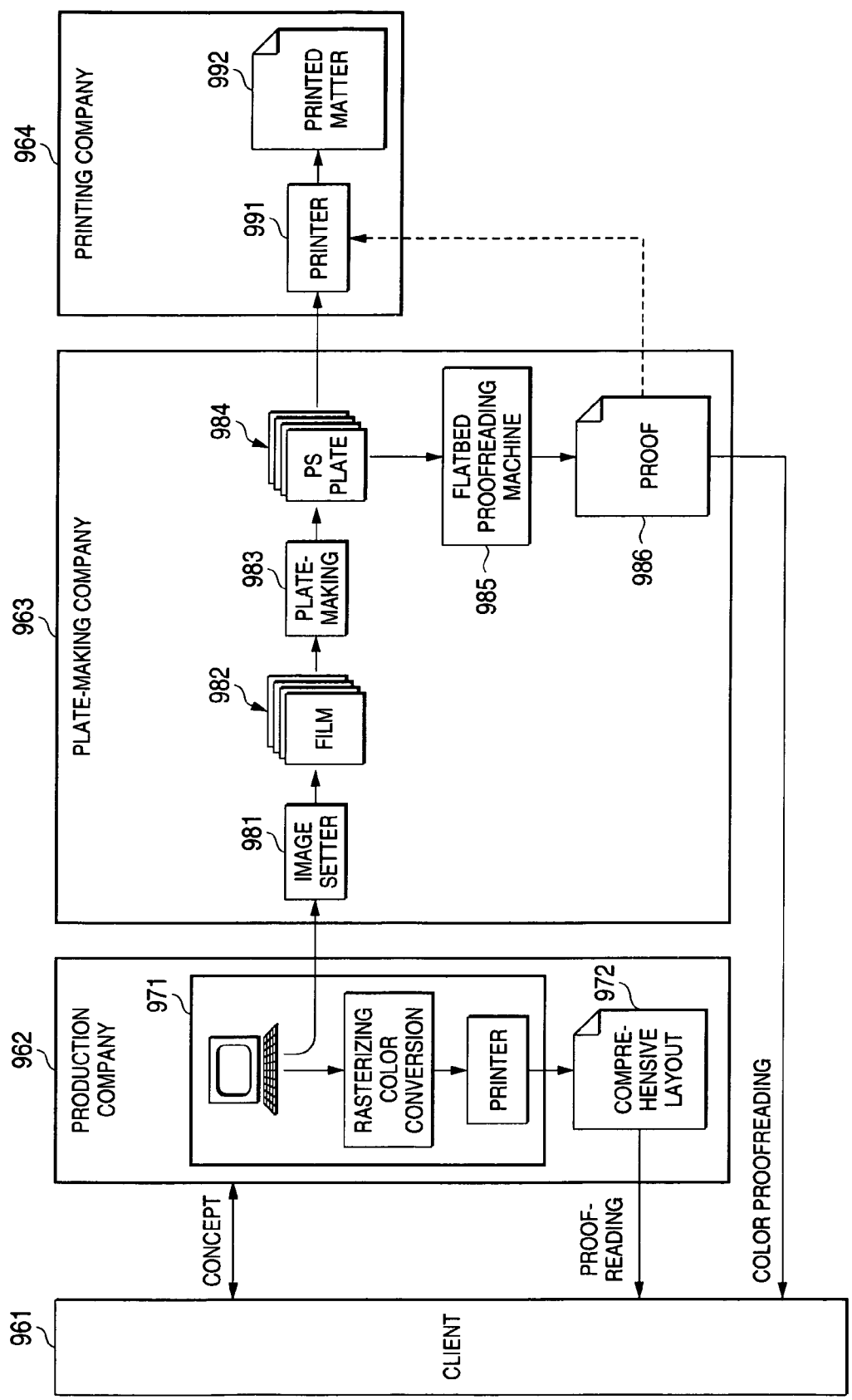
FIG. 9 is a schematic diagram of an example of an outline of a production process of a general printed matter.

Using the color image processing apparatus according to the second embodiment of the invention, for example, in the production process of general printed matter previously described with reference to FIG. 9, the color image processing system is constructed with the systems in the client 961, the production company 962, the plate-making company 963, etc., as the client systems (particularly, the system in the production company 962 as the client system 605 in FIG. 5), whereby the comprehensive layout 972 prepared in the production company 962 can be output on the printer installed in the client 961. In this case, as color conversion processing is performed in the center server 601, color conversion processing responsive to the printer installed in the client 961 and the used printer 991 is performed and thus color reproduction almost equivalent to that on the proof 986 prepared in the plate-making company 963 can also be provided on the printer installed in the client 961. Thus, the comprehensive layout 972 prepared in the production company 962 can be handled like the proof 986 and color proofreading can also be conducted at the stage of the comprehensive layout 972 to some extent. Therefore, as compared with the case where color proofreading is conducted with the proof 986 after the films 982, the PS plates 984, etc., are prepared as in the related art, the number of times proofreading is performed using the proof 986 is decreased exceptionally, the correction cost and time can be reduced greatly, and the manpower, etc., can also be made efficient with the visits of each sales representative lessened. Of course, if the client 961 consents to the design, color, etc., at the stage of the comprehensive layout 972, up to printing can be executed without preparing the proof 986 and the cost, time, etc., can be more reduced.

If facilities similar to those of the plate-making company 963 are also installed in the client 961 or the production company 962, output equivalent to the proof 986 can be produced. However, using the color image processing apparatus according to the second embodiment of the invention, the client 961 or the production company 962 can output an image reproduced in a color similar to that of the proof 986 simply by installing a reasonable output unit without installing expensive facilities.

Thus, in small and medium-sized companies, offices, etc., that cannot purchase an expensive system, it is also made possible to respond to strict requirements for coloring, made from an orderer and plan and produce printed matter using various fonts.

Further, output is also produced in the same target colors in the plate-making company 963 and the printing company 964, whereby the color tone intended by the production company 962 and the client 961 can be reproduced intact. For example, when the plate-making company 963 receives the original data approved by the client 961 from the production company 962, if an image printed on an output unit from the original data is brought into the printing company 964 as the proof 986 together with the film 982, the intended printed matter 992 can be finished. Further, if output corresponding to the proof 986 is produced on an output unit of the printing company 964, the intended printed matter 992 can be provided simply by bringing the film 982 into the printing company 964.

When the center server 601 is requested to output the original data prepared in the production company 962 onto any output unit installed in the client 961, the production company 962, the plate-making company 963, the printing company 964, etc., if an erroneous target color is specified, the reproduced color also differs from the intended color. To prevent such a mistake, for example, target color specification information may be always related to the original data or they may be placed in one piece. Alternatively, process management is executed for the original data and at the time, the target color, the output unit, and the like can also be automatically specified for preventing an instruction (specification) information error from occurring.

The shared center server 601 may be installed in one or more processing systems of the companies, offices, etc., involved in preparing of printed matter, for example, and in addition, may be operated in common as another processing system by the companies, etc., using the system or may be provide by a third party. To operate the center server 601 in common or administrate the center server 601 by a third party, the administration company can also collect a charge for use of the center server 601.

Also in the second embodiment like the first embodiment, color conversion processing can be ranked. If the color conversion processing is ranked, when color conversion processing with low color conversion accuracy is performed, the load of the center server 601 can be lessened. To return the merit provided by lessening the load to the user, the charging section 618 may charge in response to the rank. For example, the charge for each rank may be set so that if the color conversion processing at a low rank of color conversion accuracy is performed, it can be performed with a low charge.

Also in the second embodiment like the first embodiment, the output unit in each client server can be calibrated and the color management section 19 in the center server 601 can manage the state of color reproduction of the output unit in each client server.

If color conversion processing with high accuracy cannot be guaranteed, the color management section 19 also provides information indicating the fact. For example, the remote system inquires about management information with specification of the output unit, whereby the management information of the output unit can be referenced. If the management information indicates the condition to the effect that color reproducibility cannot be guaranteed, countermeasures of producing no output, etc., are taken, so that the reproduced color variation from one output unit to another can be prevented.

In the description given above, if it becomes impossible to guarantee color reproduction, the client system is warned. In addition, for example, when the time approaches the calibration processing period, the client system may be informed of the fact. The color management section 19 and the color conversion section 13 can also be operated in association so as to reject color conversion processing with specification of the output unit whose color reproduction cannot be guaranteed or send a message to the effect that color reproduction cannot be guaranteed to the output unit 18 for acknowledgement, etc.

The charging section 618 can charge for various types of management processing to guarantee color reproduction of the color management section 19; various factors of the management contents of correcting the color conversion information, sending a warning, etc., the management time period, the processing contents (for example, calibration processing ranks, etc.,), and the like can be added for the charging section 618 to charge. For example, it is also possible to charge on various bases such as a management time period basis and a color conversion information correcting basis resulting from calibration.

Figure 7:
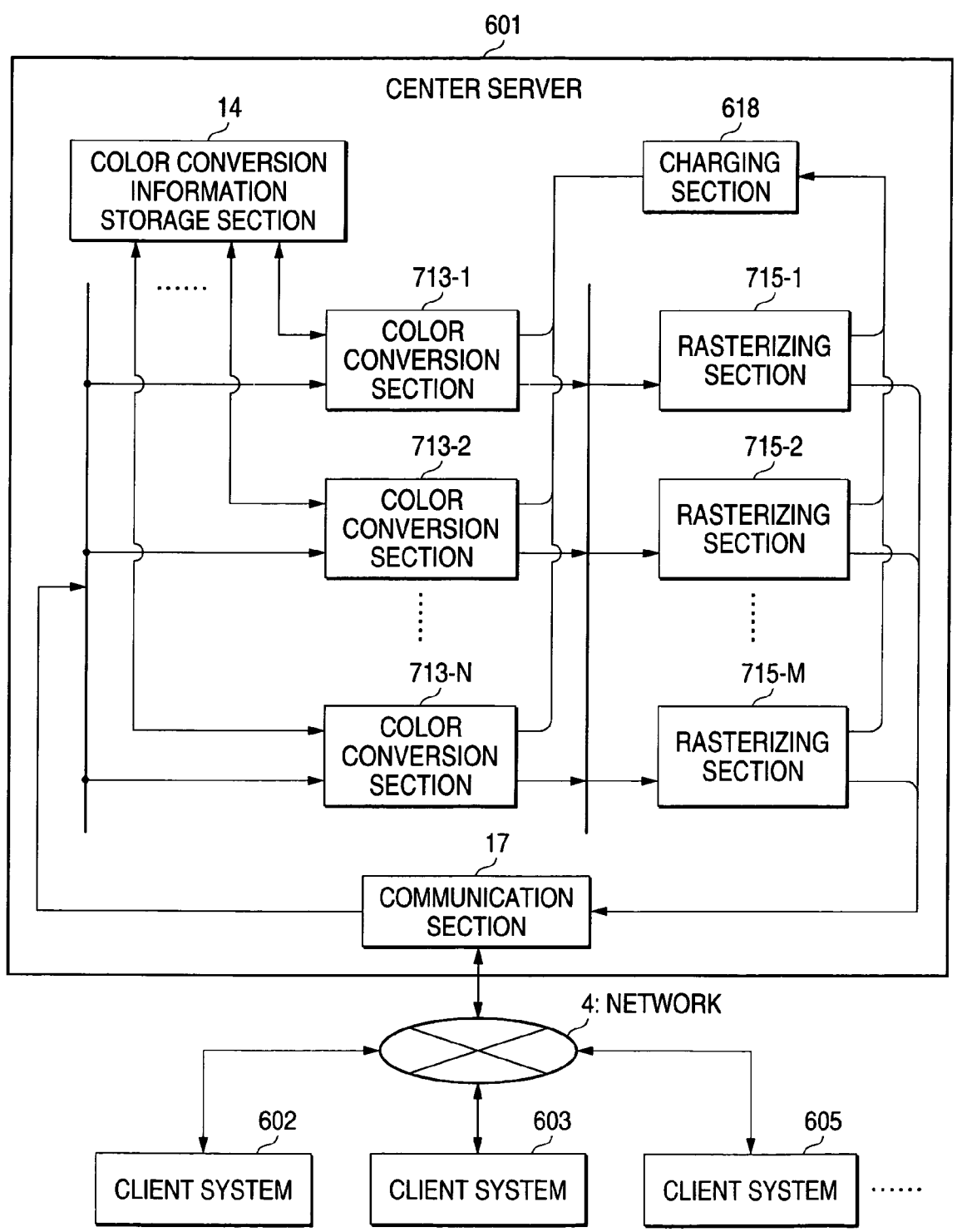
FIG. 7 is a block diagram to show another example of the center server.

FIG. 7 is a block diagram to show another example of center server. Parts similar to those previously described with reference to FIG. 6 are denoted by the same reference numerals in FIG. 7 and will not be discussed again. In FIG. 7, numerals 713-1 to 713-N denote color conversion sections and numerals 715-1 to 715-M denote rasterizing sections. In the example, the center server 601 contains the N color conversion sections 713-1 to 713-N and the M rasterizing sections 715-1 to 715-M. Each of the color conversion sections 713-1 to 713-N is similar to the above-described conversion section 13 and each of the rasterizing sections 715-1 to 715-M is similar to the above-described rasterizing section 15. A plurality of the color conversion sections and a plurality of the rasterizing sections are thus provided, so that the center server 601 can respond to color conversion processing and rasterizing processing requests sent from a larger number of client systems.

When a color conversion processing request sent from one of the client systems is accepted at a communication section 17, if any of the color conversion sections 713-1 to 713-N is idle, the idle color conversion section is selected; if the color conversion sections 713-1 to 713-N are all busy, the request is added to a queue. In this case, which of the color conversion sections 713-1 to 713-N is to execute which of the requests placed in the queue is controlled depending on the processing load on each color conversion section, etc., for example, whereby efficient color conversion processing can be executed.

Likewise, for original data for which color conversion processing is to be performed in any of the color conversion sections 713-1 to 713-N and is further to be rasterized, when a request is accepted or during or after the color conversion processing, which of the rasterizing sections 715-1 to 715-M is to rasterize the data is determined. If any of the rasterizing sections 715-1 to 715-M is idle, the idle rasterizing section is selected; if the rasterizing sections 715-1 to 715-M are all busy, the original data is added to a queue. In this case, which of the rasterizing sections 715-1 to 715-M is to rasterize which of the original data pieces placed in the queue is controlled depending on the processing load on each rasterizing section, etc., for example, whereby efficient rasterizing processing can be executed.

In the example, a plurality of the color conversion sections and a plurality of the rasterizing sections are provided, but a plurality of the color conversion sections and one rasterizing section or one color conversion section and a plurality of the rasterizing sections can also be provided. Generally, rasterizing processing takes longer time than color conversion processing and thus a larger number of rasterizing sections may be provided in a situation in which much original data is rasterized.

In the description of the embodiment, the color conversion information stored in the color conversion information storage section 14 of the center server 601 is used only in the center server 601. However, for example, the color image processing system may be configured so that the color conversion information stored in the color conversion information storage section 14 can be downloaded into the client system. Any desired color conversion information of the downloaded color conversion information may be selected and transferred to the center server 601 as a part of instruction information together with original data for requesting the center server 601 to perform color conversion processing for the original data. The center server 601 may use the color conversion information sent from the client system to perform color conversion processing by the color conversion section 13. However, to always provide color reproducibility with high accuracy, it is desired that the color conversion information transferred to the center server 601 should always be updated to the most recent information.

If the output unit has the color conversion processing function using color conversion information, the center server 601 may transfer the color conversion information corresponding to instruction information together with original data to the output unit without performing color conversion processing. In this case, color conversion processing is performed in the output unit in accordance with the color conversion information sent from the center server 601. Also in this case, the color conversion information is information set so as to provide the same output color as the target color in the output unit and thus if color conversion processing is performed and output is produced, almost the same color as the target color can be reproduced. Transferring the color conversion information to the output unit or performing color conversion processing in the center server 601 can be selected in response to the output unit. If the output unit does not have the function of reading the color conversion information and performing color conversion processing, color conversion processing may be performed in the center server 601 as described above. Even if the color conversion information is transferred to the output unit, rasterizing processing for the original data may be performed in the center server 601.

As seen from the description made above, according to the invention, color conversion processing is performed in response to each output unit so that the color output on the specified output unit becomes the target color, and thus almost similar color reproduction can be accomplished on every output unit. The final printed matter color is specified as the target color, whereby if the original data after undergoing color conversion is output to any output units, almost similar color reproduction can be accomplished. Accordingly, for example, if the original data prepared in the production company is printed out on a printer in the company, a printer installed in the client, and a printer in the plate-making company, images reproduced in almost similar colors can be provided. At this time, the need for installing an expensive color conversion apparatus for each output unit as in the related art is eliminated and color conversion processing can be performed with high accuracy at low costs. Therefore, reasonable color proofreading can be completed before plate making without conducting final color proofreading using a proof at the plate making time as in the related, the required time can be shortened, the costs can be reduced, and the manpower for transporting proofs, etc., can be decreased. Thus, according to the invention, the color image processing system can be used in each process of preparing printed matter and the printed matter preparation process in the related art can be changed to electronization.

Further, in the invention, color management in each output unit is executed in the center server. For example, if the output unit or the client system in which the output unit is installed has the calibration function for adjusting the color reproducibility of the output unit, management is conducted as to whether or not calibration processing is performed periodically, whether or not the color reproducibility of the output unit is out of a predetermined criterion, etc. For example, if the output unit or the client system in which the output unit is installed cannot execute calibration, the center server performs calibration processing and also conducts management as to whether or not the calibration processing is performed periodically, whether or not the color reproducibility of the output unit is out of a predetermined criterion, etc. The color management in each output unit is thus executed in the center server, whereby the color reproducibility can always be guaranteed.

What is claimed is:

1. A color image processing system for outputting a color image from an output unit connected via a network, said color image processing system comprising:
    a color proof generation section for performing color conversion processing for an original data so that a color, when the output unit specified by an instruction information specifying the output unit produces an output based on the original data, becomes a target color; and
    a communication section for transferring the original data undergoing the color conversion processing to the output unit specified by the instruction information via the network.

2. The color image processing system according to claim 1 wherein said color proof generation section expands the original data undergoing the color conversion processing into a raster data; and
    said communication section transfers the raster data provided by said color proof generation section to the output unit specified by the instruction information.

3. The color image processing system according to claim 1 wherein the network is the Internet.

4. The color image processing system according to claim 1 further comprising an instruction section for inputting the instruction information.

5. The color image processing system according to claim 1 wherein the output unit has a function of transmitting a calibration information indicating color reproduction change with time; and
    said color proof generation section acquires the calibration information from the output unit via the network through said communication section and executes calibration at color conversion time based on the acquired calibration information.

6. The color image processing system according to claim 1 wherein said communication section receives the original data and the instruction information from an external system and transfers the original data undergoing the color conversion processing in accordance with the instruction information; and
    said color proof generation section performs color conversion processing for the original data received at said communication section so as to conduct precise color reproduction on the corresponding output unit in accordance with the instruction information received at said communication section.

7. The color image processing system according to claim 6 wherein said color proof generation section expands the original data undergoing the color conversion processing into raster data; and
    said communication section transfers the raster data provided by said color proof generation section in accordance with the instruction information.

8. The color image processing system according to claim 1 wherein said color proof generation section stores a color conversion information set so that the color, when each output unit produces the output based on the original data, becomes the target color in a one-to-one correspondence with the output units, and performs color conversion processing for the original data using the color conversion information corresponding to the instruction information.

9. The color image processing system according to claim 8 wherein the instruction information including information specifying the output unit and information specifying the target color; and said color proof generation section stores the plurality of color conversion information in a one-to-one correspondence with the output units and the plurality of target colors, and performs color conversion processing for the original data using the color conversion information corresponding to the information specifying the output unit and the information specifying the target color.

10. The color image processing system according to claim 8 wherein the instruction information including the information specifying the output unit and an information indicating a color conversion accuracy rank; and said color proof generation section stores the color conversion information at the plurality of ranks corresponding to the color conversion accuracy in a one-to-one correspondence with the output units and performs color conversion processing for the original data using the color conversion information corresponding to the information specifying the output unit and the information indicating the color conversion accuracy rank.

11. The color image processing system according to claim 1 wherein said color proof generation section executes calibration at color conversion time based on a color sample output on the output unit.

12. The color image processing system according to claim 11 wherein a fee is charged for the calibration at the color conversion time.

13. The color image processing system according to claim 1 wherein the output unit has a function of transmitting a color conversion information set so that the color, when the output unit produces an output based on the original data, becomes the target color; and said color proof generation section receives the color conversion information transmitted from the output unit via the network through said communication section after the original data undergoing the color conversion processing is sent and determines whether or not the color conversion information for the sent original data undergoing the color conversion processing is adequate, and outputs the determination result.

14. The color image processing system according to claim 13 wherein a fee is charged for determining whether or not the color conversion information is adequate.

15. The color image processing system according to claim 1 wherein said color proof generation section receives a calibration information indicating color reproduction change with time from the output unit and manages color reproducibility of the output unit based on the calibration information.

16. The color image processing system according to claim 15 wherein said color proof generation section stores a color conversion information set so that the color, when each output unit produces the output based on the original data, becomes the target color in a one-to-one correspondence with output units, and performs color conversion processing for the original data using the color conversion information corresponding to the instruction information, and if necessary, corrects the color the conversion information based on the calibration information received from the output unit.

17. The color image processing system according to claim 15 wherein said color proof generation section warns the output unit when the calibration is not conducted during a predetermined time period in the output unit.

18. The color image processing system according to claim 15 wherein said color proof generation section analyzes the calibration information received from the output unit and warns the output unit if the color reproducibility of the output unit is out of a predetermined criterion.

19. The color image processing system according to claim 1 wherein said color proof generation section stores a color conversion information set so that the color, when each output unit produces the output based on the original data, becomes the target color in a one-to-one correspondence with output units, and performs color conversion processing for the original data using the color conversion information corresponding to the instruction information, and corrects the color conversion information corresponding to the output unit based on a color measurement sample output from the output unit.

20. The color image processing system according to claim 19 wherein said color proof generation section warns the output unit when the color conversion information correction processing using the color measurement sample for the output unit is not executed during a predetermined time period.

21. The color image processing system according to claim 19 wherein if it is determined from the color measurement sample that the color reproducibility of the output unit outputting the color measurement sample is out of a predetermined criterion, said color proof generation section warns the output unit.

22. The color image processing system according to claim 19 wherein the color measurement sample includes a plurality of ranks.

23. The color image processing system according to claim 1 wherein a fee is charged to a user for use of said color image processing system.

24. A color image processing system for outputting a color image from an output unit connected via a network, said color image processing system comprising:

a color proof generation section for expanding an original data into a raster data; and a communication section for transferring the original data expanded into the raster data to the output unit specified by an instruction information specifying the output unit via the network.

25. The color image processing system according to claim 24 wherein a fee is charged to a user for use of said color image processing system.

* * * * *